Fig. 2.

Inventor
Lloyd G. Miller
By his Attorney
Thomas J. Ryan

April 25, 1950 L. G. MILLER 2,505,134
LASTING MACHINE
Filed July 23, 1947 9 Sheets-Sheet 3

Fig. 3.

Inventor
Lloyd G. Miller
By his Attorney
Thomas J. Ryan

Inventor
Lloyd G. Miller
By his Attorney
Thomas J. Ryan

April 25, 1950     L. G. MILLER     2,505,134
LASTING MACHINE Filed July 23, 1947          9 Sheets-Sheet 6

Inventor
Lloyd G. Miller
By his Attorney
Thomas Ryan

April 25, 1950 L. G. MILLER 2,505,134
LASTING MACHINE
Filed July 23, 1947 9 Sheets-Sheet 8

Inventor
Lloyd G. Miller
By his Attorney

Patented Apr. 25, 1950

2,505,134

UNITED STATES PATENT OFFICE 2,505,134

LASTING MACHINE

Lloyd G. Miller, Beverly Mass., assignor to United Shoe Machinery Corporation, Flemington, N. J., a corporation of New Jersey Application July 23, 1947, Serial No. 762,841

16 Claims. (Cl. 12—8.8)

This invention relates primarily to lasting machines, and is herein illustrated as embodied in a machine for lasting the toe ends of Goodyear welt shoes. It is to be understood, however, that in some aspects it is not limited to machines for lasting shoes of that particular type.

In lasting the toe ends of shoes of the above-mentioned type, among others, it is the common practice to use a pair of toe-embracing wipers which wipe the toe end of the upper heightwise of the last and thereafter wipe its marginal portion inwardly over an insole on the last, the wipers being shaped to conform to the contour of the last around the toe at the edge of the last bottom. An object of this invention is to provide toe-lasting means which will operate with improved results in the wiping of the toe end of the upper heightwise of the last when, as usual, the last at the end and the sides of the toe has a substantial inward curvature toward the top of the toe from near the edge of the last bottom, and also on welt shoe work to improve the results in the wiping of the marginal portion of the upper inwardly against a lip or shoulder on the insole. To this and other ends, the construction herein shown comprises two pairs of differently shaped wipers, one pair being shaped to conform substantially to the contour of the upper about the toe at a distance from the edge of the last bottom and the other pair being shaped to conform substantially to the contour of the upper at the edge of the last bottom or opposite the edge face of the insole. These pairs of wipers are so controlled in a cycle of operations of the machine that in wiping the upper heightwise of the last they operate only on the portions of the upper to which they thus substantially conform, one pair being substituted for the other pair in effective wiping engagement with the upper in the course of relative movement of the wipers and the last heightwise of the last. In operating on welt shoe work the wipers which thus conform substantially to the upper at a distance from the edge of the last bottom also conform substantially to the contour of the margin of the upper opposite the welt-attaching lip or shoulder on the insole and are further operated to wipe the upper inwardly against the lip or shoulder, thus preparing the upper in the best manner for the attachment of the welt.

To assist in conforming the upper tightly and smoothly to the last and the insole, the machine herein shown includes a retarder which clamps the upper on the last-mentioned wipers as the upper is wiped heightwise of the last, the tightening action on the upper being increased by outward movement of these wipers from the last when the other wipers become effective on the upper and by a corresponding outward movement of the retarder.

The above and other features of the invention, including various novel details of construction and combinations of parts, will now be more particularly described with reference to the accompanying drawings and thereafter pointed out in the claims.

The machine is provided with a shoe support 2 (Figs. 2 and 9) comprising a block 4 fast on the upper end of a rod 6 which is guided for upward and downward movements in a bearing 8 formed in a crossbar 10 secured at its opposite ends (Fig. 4) to the frame of the machine. Detachably held on the block 4 by means of the same construction as disclosed in United States Letters Patent No. 2,444,141, granted June 29, 1948, on an application of mine, is a plate 12 formed to engage and support the bottom of the forepart of a welt shoe and also to fit the inner face of a lip a (Fig. 10) on the insole and thereby to position the shoe heightwise, lengthwise and laterally. Also mounted on the block 4 is a rod 14 which is threaded in the block for upward or downward adjustment and is provided on its upper end with a pad 16 arranged to engage and support the bottom of the shoe at or near its heel end. It will be understood that this rod is adjusted at the proper height thus to support the shoe when the bottom of its forepart rests evenly on the curved upper face of the plate 12. The movable rod 6 on which the block 4 is mounted has a ball-shaped lower end 18 (Fig. 2) confined in a socket formed in a lever 20 which is pivotally supported at one end on a link 22 pivotally mounted on a bracket 24 on the frame. The other end of the lever 20 is provided with a roll 26 (Figs. 2 and 4) engaged by a path cam formed in one side of a cam wheel 28 fast on a cam shaft 30. By this cam, therefore, upward and downward movements are imparted to the rod 6 and the shoe support 2 at the proper times in the cycle of operations, as more fully hereinafter explained.

Substantially at the beginning of the cycle of operations the forepart of the shoe is clamped against the plate 12 by a toe rest 32 mounted on a rod 34 (Fig. 2) supported by a yoke 36 which has two downwardly extending arms 38 (Fig. 3) slidingly mounted in guides 40 (Figs. 1 and 3) on the frame. Pivotally mounted on the lower ends of these arms are blocks 42 engaged by the forked front ends of levers 44 (Fig. 4) which are pivotally mounted at their rear ends on a rod 46 on the frame. Supported on each lever is a roll 48 engaged by a path cam formed in one side of a cam wheel 50 fast on the cam shaft 30, one of these path cams being shown at 52 in Fig. 2. By these cams, therefore, downward and upward movements are imparted at the proper times to the yoke 36, as also more fully hereinafter explained.

Figure 2:
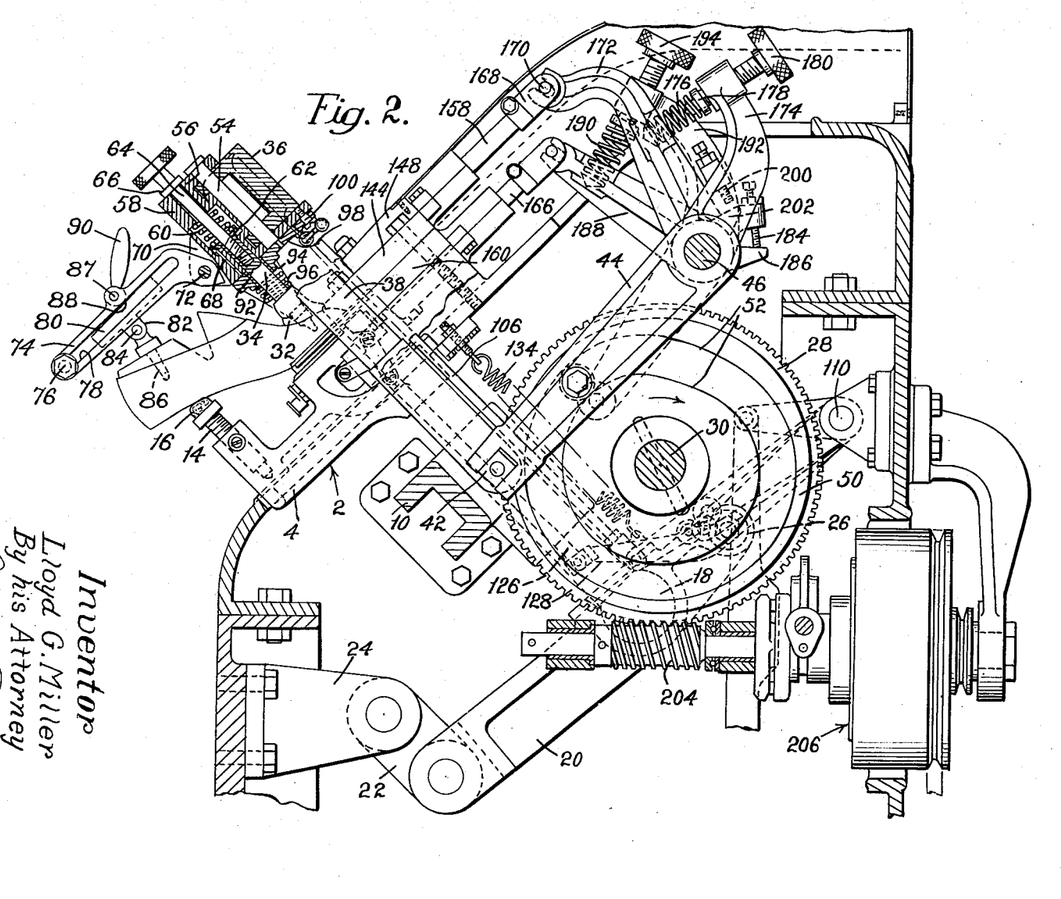
Fig. 2 is a similar view on a larger scale of the upper portion of the machine, showing the parts as they appear when the wipers are acting on the shoe.
Figure 3:
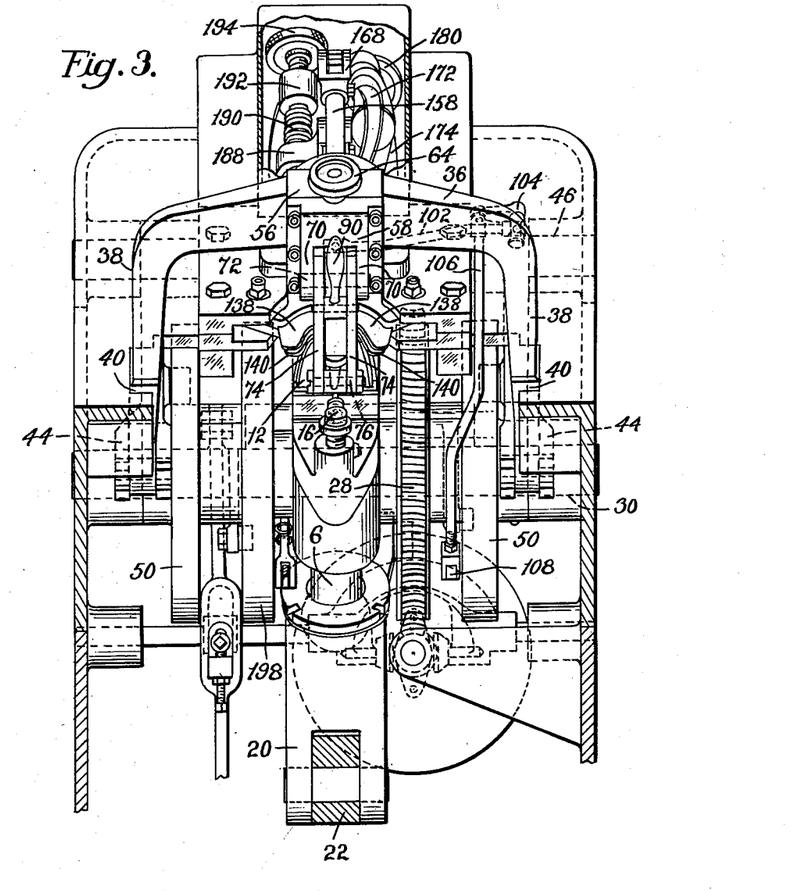
Fig. 3 shows the upper portion of the machine mainly in front elevation.

Pivotally mounted on a pin 54 in the yoke 36 is a member 56 portions of which extend over and under the yoke as shown in Fig. 2, and secured on the front of this member is a plate 58 (Figs. 2 and 3). The member 56 and the plate 58 provide a bearing for the rod 34 on which the toe rest 32 is mounted and also provide a recess for a spring 60 the lower end of which is seated on a cup-shaped flange 62 formed on the upper end of the rod. Threaded in a socket in the rod is a screw 64 which extends upwardly through the spring and through recesses in the member 56 and the plate 58 and has thereon a flange 66 arranged to engage the member and the plate to limit downward movement of the toe rest under the influence of the spring. It will be understood that by turning the screw the toe rest may be adjusted in a downward or an upward direction relatively to the yoke 36, and that upon downward movement of the yoke the spring 60 is yieldable after engagement of the toe rest with the shoe. Extending downwardly from the flange 62 on the rod 34 into a hole in the plate 58 is a pin 68 to prevent the toe rest from turning relatively to the member 56.

Figure 1:
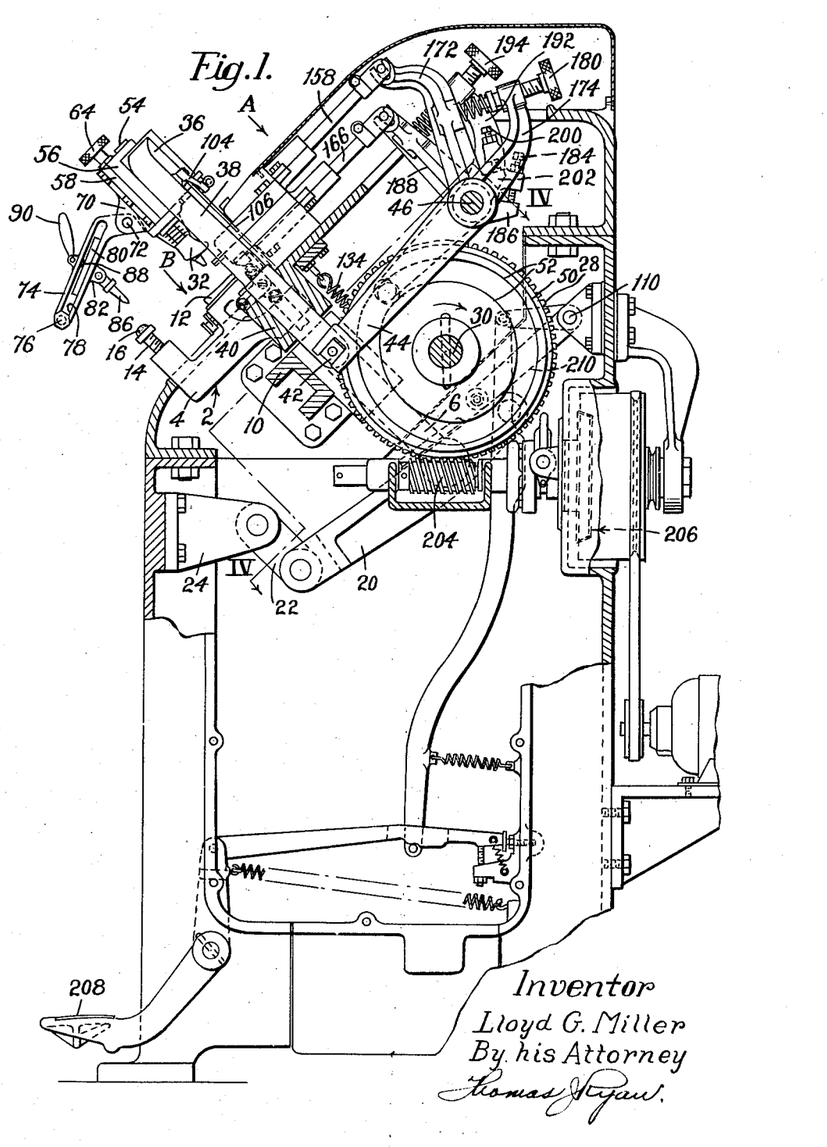
Fig. 1 is a view partly in right-hand side elevation and partly in section of the machine in which the invention is herein shown as embodied, with the parts in their starting positions.

Pivotally supported on ears 70 (Figs. 2 and 3) on the front of the plate 58 by means of a pin 72 are two forwardly and downwardly extending arms 74 connected together in spaced relation to each other at their lower ends by a tie bolt 76 to swing in unison about the axis of the pin 72. Formed on these arms are guideways 78 for a block 80 provided with an ear 82 extending downwardly between the arms, and pivotally mounted on a pin 84 in the ear 82 is a last pin 86 arranged to enter the usual spindle hole in the heel end of the last. Pivotally mounted on a pin 87 in the arms 74 is an eccentric 88 positioned between the arms and having a handle 90 extending therefrom, the eccentric being arranged to engage the top face of the block 80 to secure the block in any position of adjustment along the guideways 78. Initially the arms 74 are positioned as shown in Fig. 1, downward movement thereof about the axis of the pin 72 being limited by engagement of portions of the arms near the pin with the front face of the plate 58. After the operator has mounted a shoe on the plate 12 and the heel-end support 16 in the position determined by the plate, he inserts the last pin 86 in the spindle hole in the last, adjusting the block 80 if necessary and then locking it by the eccentric 88. When the yoke 36 is thereafter moved downwardly to apply the toe rest 32 to the shoe the arms 74 in response to that movement swing a short distance about the axis of the pin 72 with a toggle-like action tending to force the last pin 86 in a heelward direction. In this manner force is applied to the last and shoe to seat the lip of the insole at the end of the toe firmly against the plate 12. Thereafter, in the operation of the machine on the shoe, the last pin 86 assists in holding the shoe against lengthwise movement in a heelward direction, thus preventing excessive strain on the lip of the insole at the end of the toe. For better insurance that the last pin will be held firmly against any force tending to displace the shoe in a heelward direction, the top face of the block 80 which is engaged by the eccentric 88 is inclined relatively to the arms 74 lengthwise of the arms, as illustrated in Fig. 2, to render the eccentric more effective as a lock for the last pin.

The ball-shaped lower end 18 of the rod 6 permits the shoe support 2 to swing in directions widthwise of the shoe about the axis of the rod. The pin 54 is coaxial with the rod 6, and therefore the toe rest 32 and the last pin 86 may swing with the shoe support about the same axis. Such swinging movement may take place in the course of the operation of the machine in response to pressure of the wipers (hereinafter described) on one side or the other of the toe end of the shoe to permit the shoe to adjust itself in this manner to the wipers.

Figure 5:
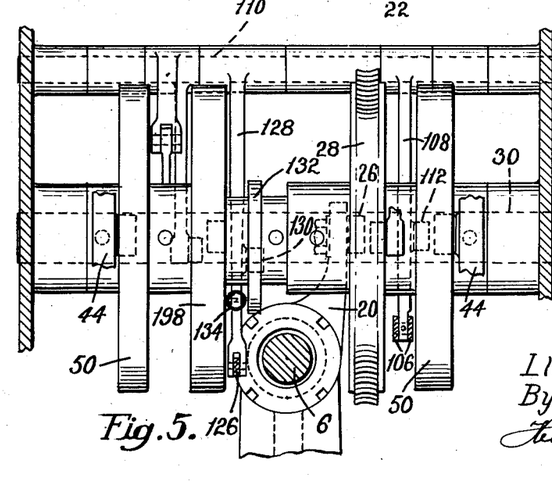
Fig. 5 is a view generally similar to Fig. 4 but with parts broken away to show other parts more clearly.

Mounted to turn about a kushing 92 (Fig. 2) on the rod 34 is a member 94 which may be termed a wire looper, this member being pressed up against the member 56 and the plate 58 by a spring 96 mounted between it and the toe rest 32. This wire looper is not herein shown in detail, but it is of essentially the same construction as a device provided for the same purpose in accordance with the disclosure of Letters Patent No. 2,160,846, granted on June 6, 1939, on an application of F. C. Eastman's and A. F. Pym's. Its function is to form a loop on the end portion of a binder wire positioned thereon preparatory to the attachment of the looped end of the wire by the operator to a tack driven at one side of the shoe bottom before the wire is applied about the toe to hold the upper in lasted position. It performs this function in the machine herein shown by swinging part way around the rod 34. For thus swinging it there is provided a gear segment 98 engaging teeth on the looper and mounted to swing about a pin 100 on the lower rearwardly extending portion of the member 56. The gear segment is connected by a link 102 (Fig. 3) to one arm of a bell-crank lever 104 mounted on the yoke 36 (see Fig. 1), the other arm of this bell-crank lever being connected by a link 106 to a lever 108 (Fig. 5) mounted to swing about a rod 110 on the frame. Mounted on the lever 108 is a roll 112 engaged by a path cam formed in one side of one of the previously mentioned cam wheels 50.

Figure 8:
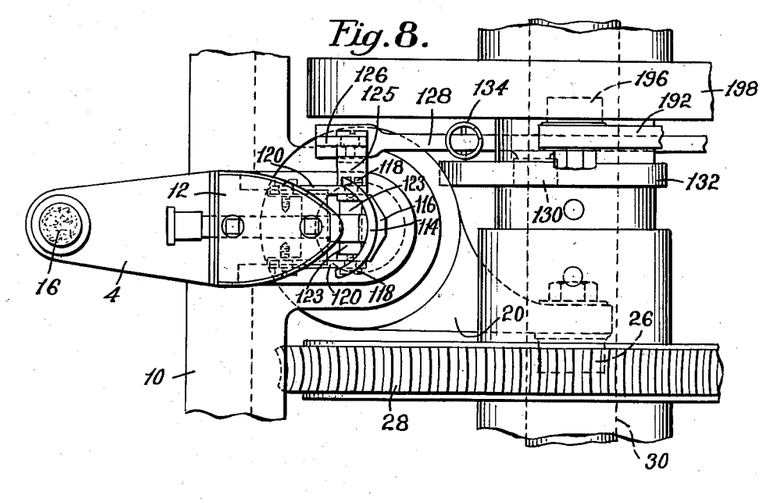
Fig. 8 is a view in the direction of the arrow B in Fig. 1, showing the shoe support and the retarder and parts associated therewith.
Figure 9:
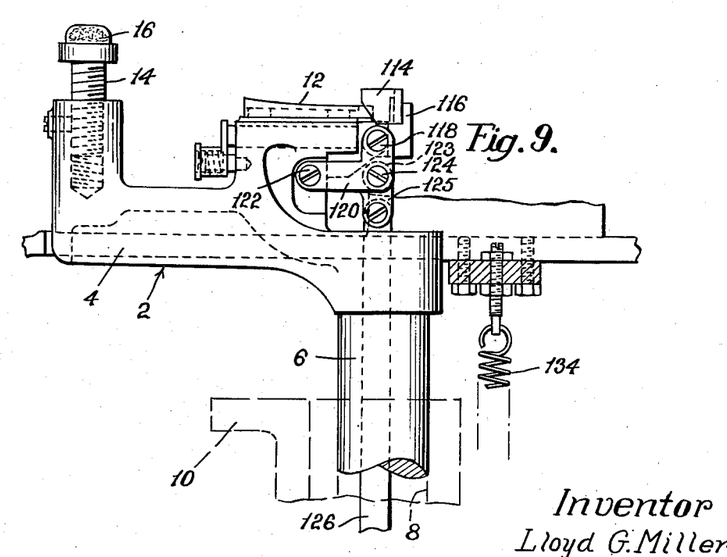
Fig. 9 is a view in right-hand side elevation of parts shown in Fig. 8, but with the parts tipped at a different angle than in Fig. 1.

The machine further includes a member 114 (Figs. 8, 9 and 10) having the function of what is commonly called a retarder and herein so termed, this retarder being arranged to cooperate with the wipers to apply a pull to the toe end of the upper as it is wiped heightwise of the last, as more fully hereinafter described. The retarder 114 is curved to extend about the end and part way along the sides of the toe and is secured to a holder 116 which is pivotally mounted on upwardly extending arms of a pair of L-shaped members 120 by studs 118 threaded in the holder. Forwardly extending arms of these members are pivotally mounted on studs 122 which are threaded in opposite sides of the shoe support block 4, and the members are further secured together by a bar 123 and screws 124. Pivotally connected to a laterally and downwardly extending arm 125 formed on one of the members 120 (Figs. 8 and 9) is the upper end of a link 126 the lower end of which is pivotally connected to the front end of a lever 128 (Figs. 2 and 5) mounted to swing about the rod 110. Mounted on this lever is a roll 130 engaged by a peripheral cam 132 on the cam shaft 30, the roll being below the cam. A spring 134 connected to the lever 128 and to the frame tends to swing the lever upwardly and holds the roll 130 normally against the cam. By this spring, therefore, the retarder 114 is positioned initially as shown in Fig. 9, its holder 116 at this time engaging an abutment face 136 (Fig. 11) on the shoe support block 4 to prevent it from turning about the studs 118. The manner of operation of the retarder will be hereinafter more fully explained in describing the operation of the machine as a whole.

Figure 6:
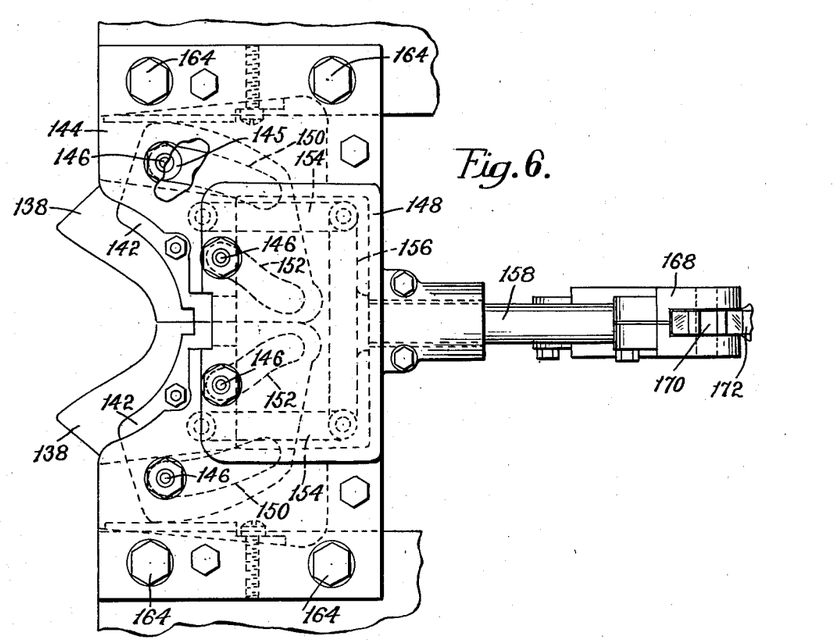
Fig. 6 is a view in the direction of the arrow A in Fig. 1, showing the wipers and a portion of the wiper-operating mechanism.
Figure 7:
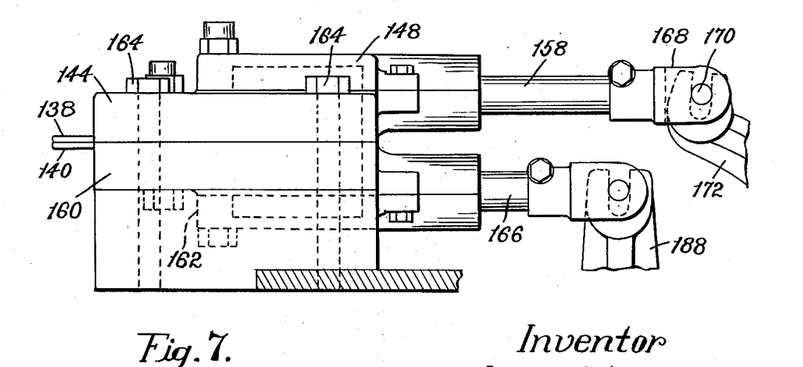
Fig. 7 is a view in right-hand side elevation of the parts shown in Fig. 6, but with the parts tipped at a different angle than in Fig. 1.
Figure 13:
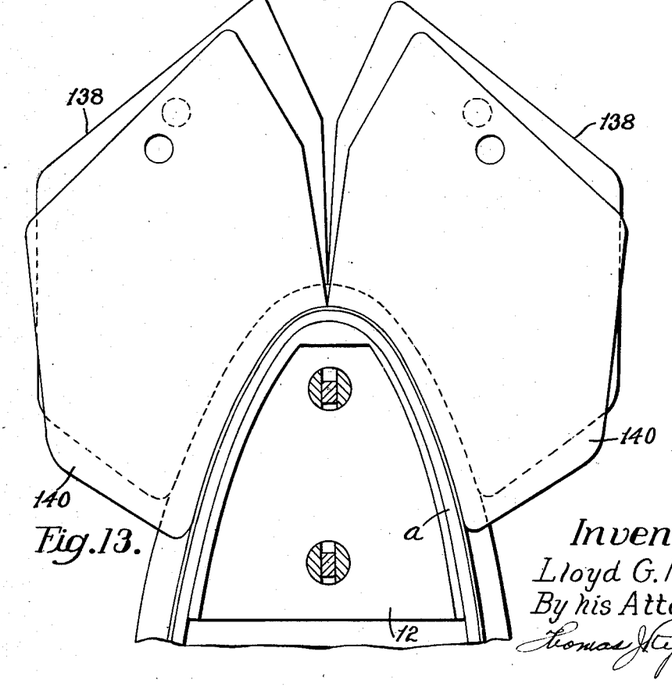
Fig. 13 shows the two pairs of wipers as viewed from below and illustrates with reference to a shoe the difference between the contours of their wiping edges.

For wiping the toe end of the upper heightwise of the last and inwardly over the insole the machine is provided with two pairs of toe-embracing wipers 138 and 140. For purposes of designation the upper pair 138 may be termed main wipers and the lower pair 140 auxiliary wipers. As illustrated in Fig. 13, the wipers 138 are so shaped that their wiping edges will conform substantially to the contour of the upper opposite the edge face of the insole and the wipers 140 are so shaped that their wiping edges will conform substantially to the upstanding margin of the upper lying against the lip a of the insole. As shown in Fig. 6, the wipers 138 are detachably secured to wiper holders 142 which are slidingly mounted in a recess formed in a casting 144. The wiper holders are guided by rolls 145 mounted on studs 146 on the casting or on a cover plate 148 fast on the casting, the rolls lying in cam slots 150 and 152 formed in the holders. The holders 142 are connected by links 154 to a crossbar 156 formed on a rod 158 which is guided for lengthwise movements in the casting 144 and the cover plate 148. Accordingly, movement of the rod in one direction serves to advance the wipers 138 lengthwise of the shoe, and simultaneously with their advancing movements they are closed inwardly widthwise of the shoe by the action of the rolls 145 on the wiper holders 142. The wipers 140 are operated and controlled by mechanism of substantially the same construction as that for operating the wipers 138, this mechanism being mounted in a recess in a casting 160 (Fig. 7) to which is secured a cover plate 162. The casting 160 and the cover plate 162 are inverted relatively to the corresponding parts associated with the wipers 138, both castings 144 and 160 being secured by bolts 164 to the frame. The wipers 140 are operated through a rod 166 corresponding to the rod 158 for operating the wipers 138. As shown in Fig. 7, the two pairs of wipers are movable in contiguous relation to each other.

Figure 4:
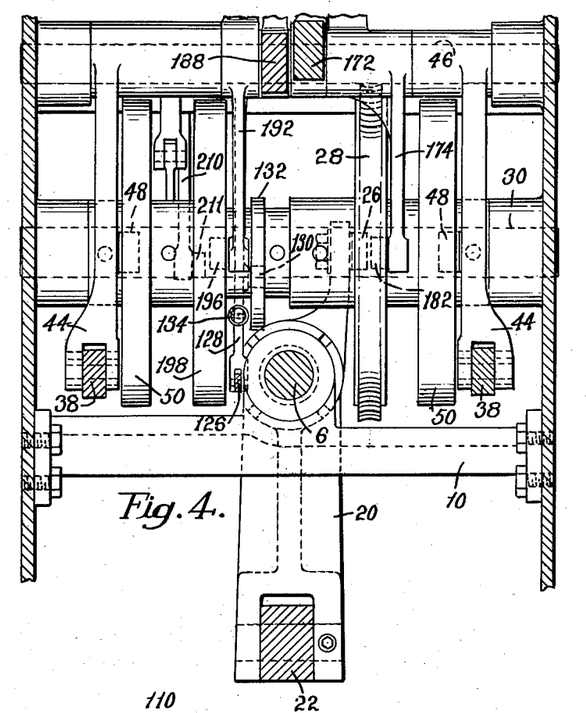
Fig. 4 is a section on the line IV—IV of Fig. 1.

The rod 158 for operating the wipers 138 has fast on its rear end a head 168 provided with a pin 170 lying in a slot formed in the upper end of an arm 172 which is mounted to swing about the rod 46 (Figs. 2 and 4). Mounted between its ends to swing also about this rod is a lever 174 which acts through a spring 176 to operate the arm 172, the spring being mounted in a recess in this arm and being engaged by a flange 178 formed on a screw 180 which is threaded in the lever 174. This lever has thereon a roll 182 (Fig. 4) engaged by a path cam formed in one side of the cam wheel 28. For returning the wipers 138 after their operative movements the lever 174 carries a screw 184 arranged to engage a lug 186 formed on the arm 172. Similarly, the rod 166 for operating the wipers 140 has a pin-and-slot connection with an arm 188 mounted to swing about the rod 46, and this arm is operated through a spring 190 by a lever 192 also mounted to swing about the rod 46, the spring being controlled by a screw 194 in the lever. The lever 192 carries a roll 196 engaged by a path cam formed in one side of a cam wheel 198 on the cam shaft 30. The wipers 140 are returned by engagement of a screw 200 on the lever 192 with a lug 202 on the arm 188.

The cam shaft 30 is operated by a worm 204 engaging teeth formed on the periphery of the cam wheel 28, and the worm is driven intermittently through a clutch 206. This clutch is controlled by mechanism which is of substantially the same construction as disclosed in the previously mentioned Letters Patent No. 2,160,846 and which, therefore, need not be described in detail. Briefly, the clutch is actuated to start the cycle of operations by depression of a treadle 208, the cycle corresponding to a complete revolution of the cam shaft 30. To bring the machine to a stop at the end of the cycle, the clutch is controlled by a cam-operated arm 210 (Figs. 1 and 4) this arm carrying a roll 211 engaged by a path cam formed in one side of the cam wheel 198. Through this arm also the machine is caused to come to a stop twice before the end of the cycle, namely at 190° and 270° of the cycle (Fig. 14), as and for the purpose disclosed in the last-mentioned Letters Patent.

Figure 14:
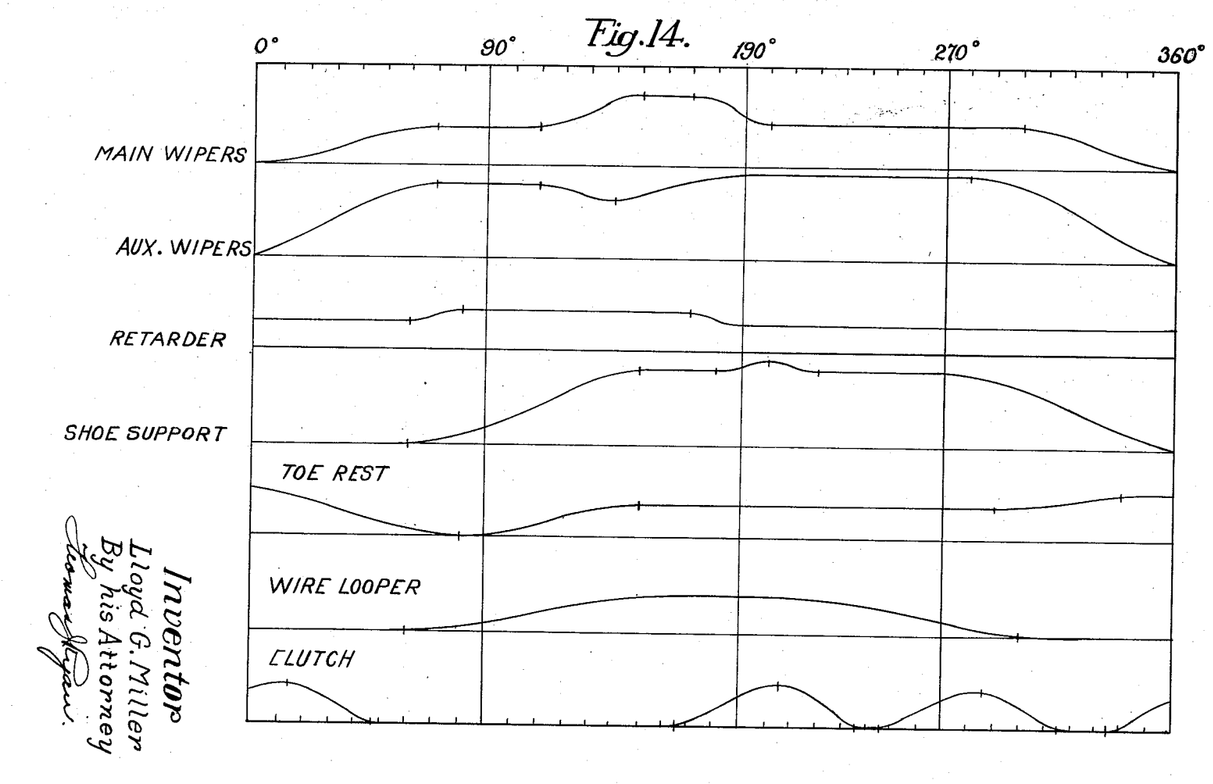
Fig. 14 is a cam chart showing the timing of the movements taking place in the cycle of operations.

The manner of operation of the machine will now be more fully explained, in so far as is necessary for an understanding of the invention, with reference to the cam chart (Fig. 14). The machine having been provided with a shoe-positioning plate 12 and with wipers 138 and 140 suitable for the style and size of shoe to be operated upon, the operator presents a shoe to the machine in the position determined by engagement of the plate 12 with the bottom of the forepart of the insole and the inner face of the lip a of the insole, the bottom of the shoe at or near its heel end resting on the pad 16 properly adjusted heightwise of the shoe. When thus presenting the shoe the operator swings the connected arms 74 upwardly to provide for clearance between the shoe and the last pin 86, after which he inserts the last pin in the spindle hole in the last. If the shoe is the first one of a given style and size to be operated upon, the block 80 will be unlocked by the eccentric 88 to permit it to assume the proper position along the arms 74, after which it will again be locked by swinging the handle 90. As the shoe is thus presented, the toe end of the upper is spread outwardly over the retarder 114, which extends upwardly at this time somewhat beyond the plate 12 as illustrated in Fig. 9.

Figure 10:
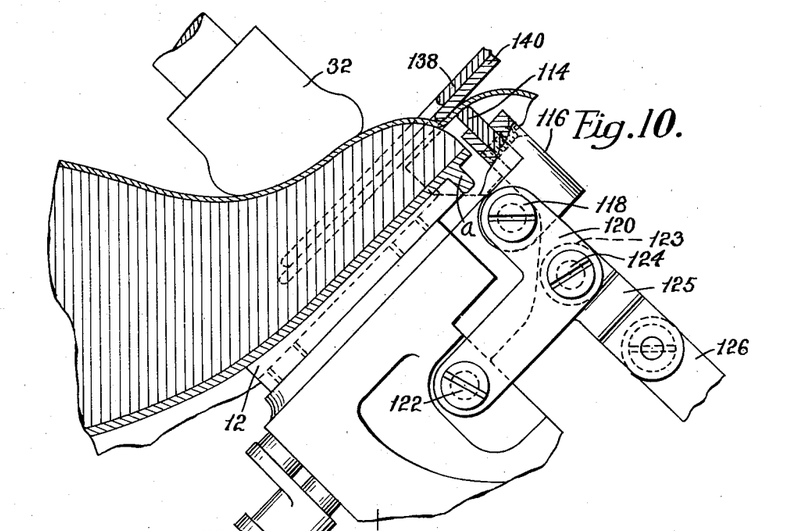
Figs. 10, 11 and 12 are views partly in right-hand side elevation and partly in section, showing the wipers and the retarder as they appear at different times in the operation of the machine on a shoe.
Figure 11:
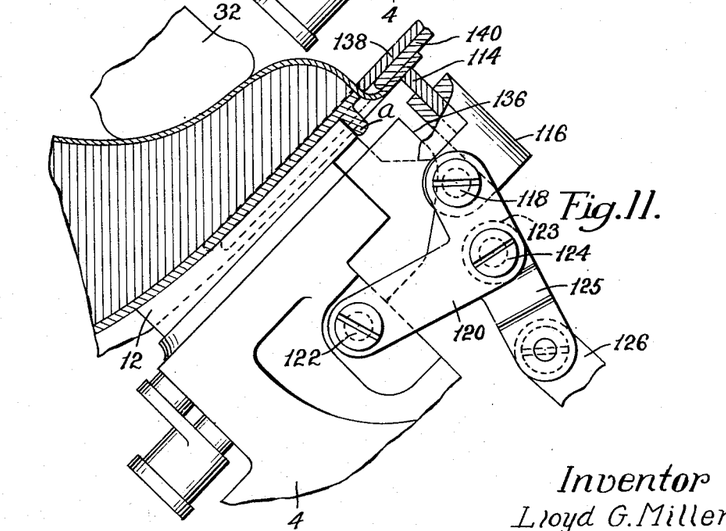
Figure 12:
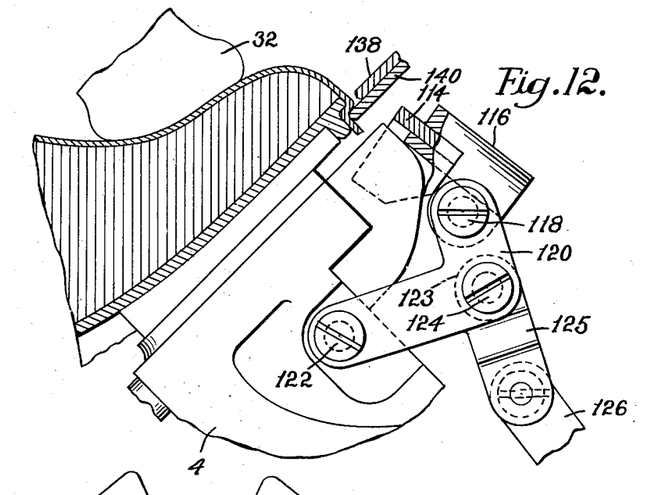

At the beginning of the cycle of operations, initiated by depression of the treadle 208, the yoke 36 is moved downwardly to cause the toe rest 32 to clamp the shoe against the plate 12, the spring 60 being compressed after engagement of the toe rest with the shoe. In response to this movement of the yoke the arms 74 swing a short distance about the axis of the pin 72 with a toggle-like action on the last pin 86, thereby forcing the last in a heelward direction to seat the lip of the insole at the end of the toe firmly against the plate 12. Simultaneously with the downward movement of the yoke 36 both pairs of wipers 138 and 140 are advanced toward the shoe and are closed about the toe above the edge of the shoe bottom, the wipers 140 being advanced and closed farther than the wipers 138. Thereafter the shoe support 2 and the yoke 36 are moved upwardly together, the shoe support beginning its upward movement before the yoke and thereby further compressing the spring 60. In this manner the shoe is moved upward to cause the wipers to wipe the upper heightwise of the last, the shoe adjusting itself laterally to the wipers by reason of the provision for swinging movement of the shoe support about the axis of the rod 6. Substantially at the beginning of the upward movement of the shoe support the cam 132 releases the lever 128, whereupon the spring 134 moves the retarder 114 farther upwardly to clamp the upper yieldingly against the wipers 140, as shown in Fig. 10. The retarder, therefore, cooperates with these wipers in applying a pull to the upper as the shoe is moved farther upwardly, and at the same time the retarder is moved outwardly lengthwise of the shoe in wiping engagement with the upper by reason of the swinging of its L-shaped supporting members 120 about the studs 122 in response to the upward movement of the shoe support. By reference to Fig. 10 it will be seen that the wiping of the upper heightwise of the last is begun by the auxiliary wipers 140 which are in effective wiping positions at that time while the main wipers 138 are somewhat retracted. This is advantageous because the wipers 140, shaped as hereinbefore described, conform more closely to the contour of the upper on the last at a distance from the edge of the last bottom than would the wipers 138. In the course of the upward movement of the shoe, however, the main wipers 138 are moved farther inwardly to effective wiping positions and the auxiliary wipers are somewhat retracted, as indicated on the cam chart, so that the wiping of the upper heightwise of the last is completed (Fig. 11) by the main wipers which are shaped to conform to the upper opposite the edge face of the insole. As the auxiliary wipers are thus retracted they cooperate with the outwardly moving retarder in applying an outward pull to the upper. Thereafter the auxiliary wipers are operated to wipe the upper inwardly over the feather and against the lip of the insole which is supported by the plate 12 against the thrust of the wipers, as shown in Fig. 12, the main wipers being retracted from engagement with the upper after the auxiliary wipers have secured an effective hold on the upper but before they complete their inward movements. Prior to the completion of the movements of the auxiliary wipers also the cam 132 moves the retarder 114 downwardly to release the margin of the upper if the latter is still between it and these wipers. The machine comes to a stop at 190° of the cycle with the auxiliary wipers holding the upper in lasted position as shown in Fig. 12, just prior to which time the shoe support is raised slightly to relieve somewhat the pressure of the auxiliary wipers heightwise of the shoe on the portion of the upper wiped over the feather of the insole.

While the machine is thus at rest the operator is afforded the same opportunity as in operating the machine disclosed in Letters Patent No. 2,160,846 to remove the end of the binder wire from the previously mentioned wire looper and to attach the looped end of the wire to a tack at the left-hand side of the shoe bottom, after which he applies the wire about the toe over the top faces of the auxiliary wipers 140 and starts to pull it inwardly between these wipers and the upper at the extreme edge of the shoe bottom. While continuing his pull on the wire he starts the machine again, whereupon the shoe support is raised farther to permit the wire to be pulled in against the upstanding margin of the upper opposite the lip of the insole. The shoe support is then moved downwardly again to restore the full pressure of the auxiliary wipers on the overwiped upper, after which the machine comes once more to a stop at 270° of the cycle. The operator then twists the wire around a tack at the right-hand side of the shoe bottom and severs the portion of the wire thus applied to the shoe from the remainder of the wire. Thereafter he starts the machine again to cause it to complete its cycle, the parts being returned to their starting positions. He then swings the arms 74 upwardly to withdraw the last pin 86 from the last and removes the shoe.

Novel features of the shoe-positioning and holding means herein disclosed are claimed in United States Letters Patent No. 2,486,535, granted November 1, 1949.

Having described the invention, what I claim as new and desire to secure by Letters Patent of the United States is:

1. In a lasting machine, different pairs of wipers formed of rigid upper-engaging material and differently shaped to conform substantially to the contour of an upper about the toe end of a last at a distance from the edge of the last bottom and near the edge of the last bottom respectively, and power-operated means for causing said wipers to wipe the toe end of the upper heightwise of the last by engagement of the different pairs of wipers in succession only with the portions of the upper to which they thus substantially conform.

2. In a lasting machine, a pair of wipers formed of rigid upper-engaging material and shaped to conform substantially to the contour of an upper about the toe end of a last at a distance from the edge of the last bottom, another pair of wipers also formed of rigid upper-engaging material and shaped to conform substantially to the contour of the upper about the toe near the edge of the last bottom, means for effecting relative movement of the last and said wipers in a direction heightwise of the last, and means for positioning the wipers in such relation to the last in the course of that relative movement as to cause the first-named wipers to wipe the upper heightwise of the last only at a distance from the edge of the last bottom and the other wipers thereafter to complete the wiping of the upper heightwise of the last near the edge of the last bottom.

3. In a lasting machine, a pair of wipers formed of rigid upper-engaging material and shaped to conform substantially to the contour of an upper about the toe end of a last at a distance from the edge of the last bottom, another pair of wipers also formed of rigid upper-engaging material and shaped to conform substantially to the contour of the upper about the toe near the edge of the last bottom, means for effecting relative movement of the last and said wipers in a direction heightwise of the last, the first-named wipers being arranged to wipe the upper heightwise of the last at a distance from the edge of the last bottom in response to that relative movement, and means for moving said other wipers inwardly toward the last into positions to continue the wiping of the upper heightwise of the last and for retracting the first-named wipers outwardly from the last prior to the completion of said relative movement.

4. In a lasting machine, a pair of wipers formed of rigid upper-engaging material and shaped to conform substantially to the contour of an upper about the toe end of a last at a distance from the edge of the last bottom, another pair of wipers also formed of rigid upper-engaging material and shaped to conform substantially to the contour of the upper about the toe near the edge of the last bottom, means for effecting relative movement of the last and said wipers in a direction heightwise of the last, the first-named wipers being arranged to wipe the upper heightwise of the last opposite the end and side faces of the last at a distance from the edge of the last bottom in response to that relative movement, and means for moving said other wipers lengthwise and widthwise of the last into positions to continue the wiping of the upper heightwise of the last prior to the completion of said relative movement and for moving the first-named wipers outwardly from the last lengthwise and widthwise thereof while they are still opposite the end and side faces of the last.

5. In a lasting machine, a pair of wipers formed of rigid upper-engaging material and shaped to conform substantially to the contour of an upper about the toe end of a last at a distance from the edge of the last bottom, another pair of wipers also formed of rigid upper-engaging material and shaped to conform substantially to the contour of the upper about the toe near the edge of the last bottom, means for effecting relative movement of the last and said wipers in a direction heightwise of the last in the course of a cycle of automatic operations of the machine, and controlling mechanisms associated respectively with the different pairs of wipers and movable in the course of the cycle to cause the first-named wipers alone first to wipe the upper heightwise of the last and the other wipers alone thereafter to continue the wiping of the upper heightwise of the last in response to said relative movement of the wipers and the last.

6. In a lasting machine, a pair of wipers formed of rigid upper-engaging material and shaped to conform substantially to the contour of an upper about the toe end of a last at a distance from the edge of the last bottom, another pair of wipers also formed of rigid upper-engaging material and shaped to conform substantially to the contour of the upper about the toe near the edge of the last bottom, means for moving the last heightwise relatively to said wipers, and cams associated respectively with the different pairs of wipers for controlling them, said cams being so formed as to cause the first-named wipers alone first to wipe the upper heightwise of the last and the other wipers alone thereafter to continue the wiping of the upper heightwise of the last in response to the movement of the last.

7. In a lasting machine, different pairs of wipers having respectively wiping edges of different fixed contours for engaging an upper about the toe end of a last and for wiping the upper heightwise of the last, means to cause one of said pairs of wipers to wipe the upper heightwise of the last only at a distance from the edge of the last bottom and the other pair thereafter to complete that operation on the upper nearer the edge of the last bottom, and a retarder for clamping the upper on said first-named pair of wipers to apply a pull to the upper as it is wiped heightwise of the last.

8. In a lasting machine, a pair of wipers shaped to conform substantially to the contour of an upper about the toe end of a last at a distance from the edge of the last bottom, another pair of wipers shaped to conform substantially to the contour of the upper about the toe near the edge of the last bottom, means for effecting relative movement of the last and said wipers in a direction heightwise of the last, the first-named wipers being arranged to wipe the upper heightwise of the last at a distance from the edge of the last bottom in response to that relative movement, means for moving said other wipers inwardly toward the last into positions to continue the wiping of the upper heightwise of the last and for moving the first-named wipers outwardly from the last prior to the completion of said relative movement, a retarder for clamping the upper on said first-named wipers to apply a pull to the upper as it is wiped heightwise of the last, and means for moving said retarder also outwardly from the last while in clamping engagement with the upper in the course of said relative movement.

9. In a lasting machine, a pair of wipers shaped to conform substantially to the contour of an upper about the toe end of a last at a distance from the edge of the last bottom, another pair of wipers shaped to conform substantially to the contour of the upper about the toe near the edge of the last bottom, means for moving the last heightwise relatively to said wipers, means to cause the first-named wipers to wipe the upper heightwise of the last and the other wipers thereafter to continue that operation on the upper in response to the movement of the last, a retarder for clamping the upper on said first-named wipers to apply a pull to the upper as it is wiped heightwise of the last, and means for moving said retarder heightwise of the last into upper-clamping position substantially at the beginning of the heightwise movement of the last.

10. In a lasting machine, a pair of wipers shaped to conform substantially to the contour of an upper about the toe end of a last at a distance from the edge of the last bottom, another pair of wipers shaped to conform substantially to the contour of the upper about the toe near the edge of the last bottom, means for moving the last heightwise relatively to said wipers, means for advancing and closing the first-named pair of wipers about the toe into positions to cause them to wipe the upper heightwise of the last in response to the movement of the last, means for substituting said other wipers for the first-named wipers in the wiping of the upper heightwise of the last prior to the completion of the movement of the last, a retarder for clamping the upper on said first-named wipers to apply a pull to the upper as it is wiped heightwise of the last, and means for moving said retarder heightwise of the last into upper-clamping position after the first-named wipers have been advanced and closed about the toe.

11. In a lasting machine, wipers shaped to conform substantially to the contour of the margin of an upper opposite a lip or shoulder on a welt shoe insole on a last about the toe end of the insole, other wipers shaped to conform substantially to the contour of the upper around the toe opposite the edge face of the insole, and means for wiping the toe end of the upper heightwise of the last by said first-named wipers at a distance from the edge of the insole and then by said other wipers nearer the edge of the insole and for thereafter wiping the upper inwardly against the lip or shoulder of the insole by the first-named wipers.

12. In a lasting machine, wipers for wiping the marginal portion of an upper about the toe end of a last inwardly over an insole on the last and against a lip or shoulder on the insole, said wipers being shaped to conform substantially to the contour of the margin of the upper opposite said lip or shoulder, other wipers shaped to conform substantially to the contour of the upper around the toe opposite the edge face of the insole, means for effecting relative movement of the last and said wipers in a direction heightwise of the last before the upper is thus wiped inwardly over the insole, and means for positioning the wipers in such relation to the last in the course of that relative movement as to cause the first-named wipers to wipe the upper heightwise of the last at a distance from the edge of the insole and the other wipers thereafter to complete the wiping of the upper heightwise of the last.

13. In a lasting machine, wipers for wiping the marginal portion of an upper about the toe end of a last inwardly over an insole on the last and against a lip or shoulder on the insole, said wipers being shaped to conform substantially to the contour of the margin of the upper opposite said lip or shoulder, other wipers shaped to conform substantially to the contour of the upper around the toe opposite the edge face of the insole, means for effecting relative movement of the last and said wipers in a direction heightwise of the last before the upper is thus wiped inwardly over the insole, the first-named wipers being arranged to wipe the upper heightwise of the last at a distance from the edge of the insole in response to that relative movement, and means for moving said other wipers inwardly toward the last into positions to continue the wiping of the upper heightwise of the last and for retracting the first-named wipers outwardly from the last prior to the completion of said relative movement.

14. In a lasting machine, wipers for wiping the marginal portion of an upper about the toe end of a last inwardly over an insole on the last and against a lip or shoulder on the insole, said wipers being shaped to conform substantially to the contour of the margin of the upper opposite said lip or shoulder, other wipers shaped to conform substantially to the contour of the upper around the toe opposite the edge face of the insole, means for effecting relative movement of the last and said wipers in a direction heightwise of the last before the upper is thus wiped inwardly over the insole, and cams associated respectively with said first-named wipers and said other wipers for controlling them with respect to movements lengthwise and widthwise of the last, said cams being so formed as to cause the first-named wipers to wipe the upper heightwise of the last only at a distance from the edge of the insole in response to said relative movement and the other wipers thereafter to complete the wiping of the upper heightwise of the last while the first-named wipers are in retracted positions.

15. In a lasting machine, wipers for wiping the marginal portion of an upper about the toe end of a last inwardly over an insole on the last and against a lip or shoulder on the insole, said wipers being shaped to conform substantially to the contour of the margin of the upper opposite said lip or shoulder, other wipers shaped to conform substantially to the contour of the upper around the toe opposite the edge face of the insole, means for effecting relative movement of the last and said wipers in a direction heightwise of the last before the upper is thus wiped inwardly over the insole, means for positioning the wipers in such relation to the last in the course of that relative movement as to cause the first-named wipers to wipe the upper heightwise of the last at a distance from the edge of the insole and the other wipers thereafter to complete the wiping of the upper heightwise of the last, and a retarder for clamping the upper on said first-named wipers to apply a pull to the upper as it is wiped heightwise of the last.

16. In a lasting machine, wipers for wiping the marginal portion of an upper about the toe end of a last inwardly over an insole on the last and against a lip or shoulder on the insole, said wipers being shaped to conform substantially to the contour of the margin of the upper opposite said lip or shoulder, other wipers shaped to conform substantially to the contour of the upper around the toe opposite the edge face of the insole, means for effecting relative movement of the last and said wipers in a direction heightwise of the last before the upper is thus wiped inwardly over the insole, the first-named wipers being arranged to wipe the upper heightwise of the last at a distance from the edge of the insole in response to that relative movement, means for moving said other wipers into positions to continue the wiping of the upper heightwise of the last and for retracting the first-named wipers lengthwise of the last prior to the completion of that relative movement, a retarder for clamping the upper on said first-named wipers to apply a pull to the upper as it is wiped heightwise of the last, and means for moving said retarder lengthwise of the last in the same direction as the retractive movement of the first-named wipers in the course of the wiping of the upper heightwise of the last.

LLOYD G. MILLER.

REFERENCES CITED

The following references are of record in the file of this patent:

UNITED STATES PATENTS

| Number | Name | Date |
|---|---|---|
| 1,135,958 | McFeely | Apr. 13, 1915 |
| 1,188,619 | Gordon | June 27, 1916 |
| 1,319,266 | Brown | Oct. 21, 1919 |
| 1,365,222 | Blake | Jan. 11, 1921 |
| 1,560,360 | Topham | Nov. 3, 1925 |
| 1,729,683 | Pym | Oct. 1, 1929 |
| 1,968,146 | Holmgren | July 31, 1934 |
| 2,131,847 | Roberts | Oct. 4, 1938 |
| 2,210,586 | Kambarian | Aug. 6, 1940 |